(12) United States Patent
Cyr et al.

(10) Patent No.: US 6,870,062 B2
(45) Date of Patent: Mar. 22, 2005

(54) THERMALLY STABLE, ANTHRAQUINONE COLORANTS CONTAINING COPOLYMERIZABLE VINYL GROUPS

(75) Inventors: Michael John Cyr, Kingsport, TN (US); Max Allen Weaver, Kingsport, TN (US); Gerry Foust Rhodes, Piney Flats, TN (US); Jason Clay Pearson, Kingsport, TN (US); Phillip Michael Cook, Kingsport, TN (US); Jos Simon De Wit, Kingsport, TN (US); Larry Keith Johnson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/719,883

(22) Filed: Nov. 21, 2003

(65) Prior Publication Data

US 2004/0110812 A1 Jun. 10, 2004

Related U.S. Application Data

(60) Division of application No. 09/911,789, filed on Jul. 24, 2001, now Pat. No. 6,689,828, which is a continuation-in-part of application No. 09/633,548, filed on Aug. 7, 2000, now abandoned.

(51) Int. Cl.$^7$ ............................... C09B 1/00; C09B 1/34
(52) U.S. Cl. ........................................... 552/234; 8/675
(58) Field of Search ............................. 552/234; 8/675

(56) References Cited

U.S. PATENT DOCUMENTS

| | | | | |
|---|---|---|---|---|
| 3,288,778 A | * | 11/1966 | Blout et al. | .................. 534/682 |
| 3,364,186 A | | 1/1968 | Wilhelm et al. | |
| 3,689,501 A | | 9/1972 | Weaver et al. | |
| 4,115,056 A | | 9/1978 | Koller et al. | |
| 4,267,306 A | | 5/1981 | Davis et al. | |
| 4,359,570 A | | 11/1982 | Davis et al. | |
| 4,403,092 A | | 9/1983 | Davis et al. | |
| 4,804,719 A | | 2/1989 | Weaver et al. | |
| 4,943,617 A | | 7/1990 | Etzbach et al. | |
| 4,999,418 A | * | 3/1991 | Krutak et al. | ................ 528/272 |
| 5,032,670 A | * | 7/1991 | Parham et al. | ............... 528/220 |
| 5,055,602 A | | 10/1991 | Melpolder | |
| 5,109,097 A | | 4/1992 | Klun et al. | |
| 5,194,463 A | | 3/1993 | Krutak et al. | |
| 5,362,812 A | | 11/1994 | Holmes et al. | |
| 5,367,039 A | | 11/1994 | Yabuuchi et al. | |
| 5,372,864 A | | 12/1994 | Weaver et al. | |
| 5,578,419 A | | 11/1996 | Itoh et al. | |
| 5,900,445 A | | 5/1999 | Chandler et al. | |
| 5,955,564 A | | 9/1999 | Weaver et al. | |
| 5,962,557 A | | 10/1999 | Weaver et al. | |
| 6,197,223 B1 | | 3/2001 | Weaver et al. | |
| 6,331,204 B1 | | 12/2001 | Carr et al. | |

FOREIGN PATENT DOCUMENTS

| | | |
|---|---|---|
| EP | 0322808 | 7/1989 |
| GB | 1046751 | 10/1966 |
| WO | WO 96/01283 | 1/1996 |
| WO | WO 97/48744 | 12/1997 |

OTHER PUBLICATIONS

Asquith et al, "Self–Coloured Polymers Based on Anthraquinone Residues", Journal of the Society of Dyes and Colourists (J.S.D.C.), Apr., 1977, pp. 114–125.

John Wiley & Sons, Encyclopedia of Polymer Science and Eng., Second Ed., vol. 11, pp. 558–571.

John Wiley & Sons, Chemistry & Technology of UV & EB Formulation for Coatings, Inks, and Paints, vol. II: Prepolymers and Reactive Diluents, G. Webster, London, 1997, pp. 35–250.

* cited by examiner

Primary Examiner—Barbara P. Badio
(74) Attorney, Agent, or Firm—Michael J. Blake; Bernard J. Graves, Jr.

(57) ABSTRACT

Disclosed are thermally-stable, anthraquinone colorant compounds (dyes) which contain one or more vinyl groups which render the compounds copolymerizable with reactive vinyl monomers to produce colored, polymeric compositions such as acrylate and methacrylate polymeric materials. The compounds possess good fastness (stability) to ultraviolet (UV) light, good solubility in vinyl monomers, good color strength and excellent thermal stability. Also disclosed are (1) coating composition comprising (i) one or more polymerizable vinyl compounds, (ii) one or more of the dye compounds described above, and (iii) a photoinitiator and (2) polymeric materials, i.e., polymers derived from one or more acrylic acid esters, one or more methacrylic acid esters, one or more other polymerizable vinyl compounds or mixtures of any two or more thereof, having copolymerized therein one or more of the anthraquinone colorant compounds.

17 Claims, No Drawings

THERMALLY STABLE, ANTHRAQUINONE COLORANTS CONTAINING COPOLYMERIZABLE VINYL GROUPS

CROSS REFERENCE TO RELATED APPLICATION

This application is a divisional of U.S. application Ser. No. 09/911,789 filed Jul. 24, 2001, now U.S. Pat. No. 6,689,828, which is a continuation-in-part of U.S. application Ser. No. 09/633,548 filed Aug. 7, 2000, now abandoned.

FIELD OF THE INVENTION

This invention pertains to certain thermally-stable, anthraquinone colorant compounds (dyes) which contain one or more vinyl groups which render the compounds copolymerizable with reactive vinyl monomers to produce colored, polymeric compositions such as acrylate and methacrylate polymeric materials. The compounds possess good fastness (stability) to ultraviolet (UV) light, good solubility in vinyl monomers, good color strength and excellent thermal stability. The present invention includes acrylic polymeric materials, i.e., polymers derived from acrylic acid esters, methacrylic acid esters and/or other copolymerizable vinyl compounds, having copolymerized therein one or more of the dye compounds of the present invention.

BACKGROUND AND PRIOR ART

It is known (J.S.D.C., April 1977, pp 114–125) to produce colored polymeric materials by combining a reactive polymer such terepolymers having epoxy groups or polyacryloyl chloride with anthraquinone dyes containing nucleophilic reactive groups such as amino or hydroxy groups; to graft acryloylaminoanthraquinone dyes to the backbone of vinyl or divinyl polymers; and to polymerize anthraquinone dyes containing certain olefinic groups to produce polymeric dyes/pigments. U.S. Pat. No. 4,115,056 describes the preparation of blue, substituted 1,4-diaminoanthraquinone dyes containing one acryloyloxy group and and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color-proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, which contain photopolymerizable groups and their use for color filters suitable for use in liquid crystal television sets, color copying machines, photosensitive resist resin compositions, and the like are described in U.S. Pat. No. 5,578,419.

BRIEF SUMMARY OF THE INVENTION

One embodiment of the present invention concerns anthraquinone dye or colorant compounds represented by general Formulae I-XXI set forth below. The dyes having Formulae I-VII are blue-cyan colorants, the dyes having Formulae VIII-XVIII are red-magenta colorants, and the dyes having Formulae XIX-XXI are yellow colorants.

Blue-Cyan Dyes

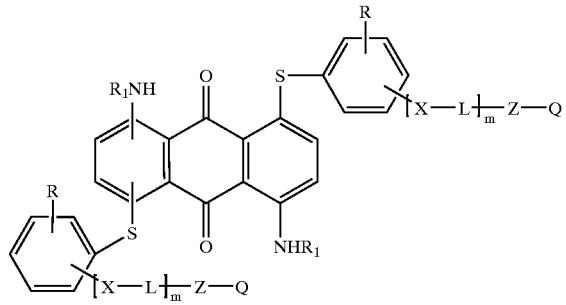

I.

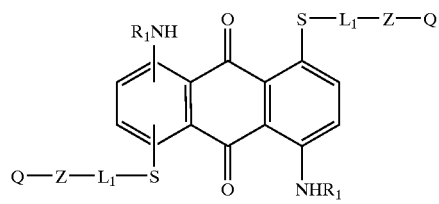

II.

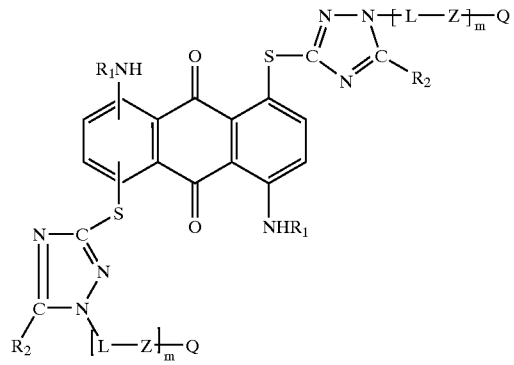

III.

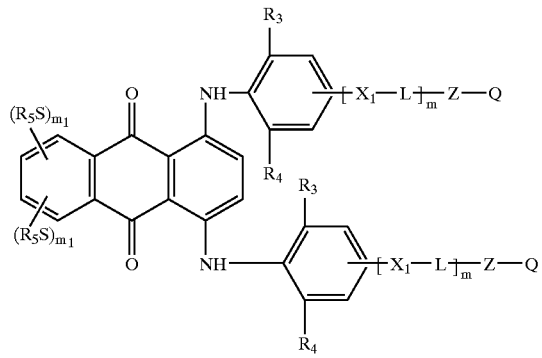

IV.

V.
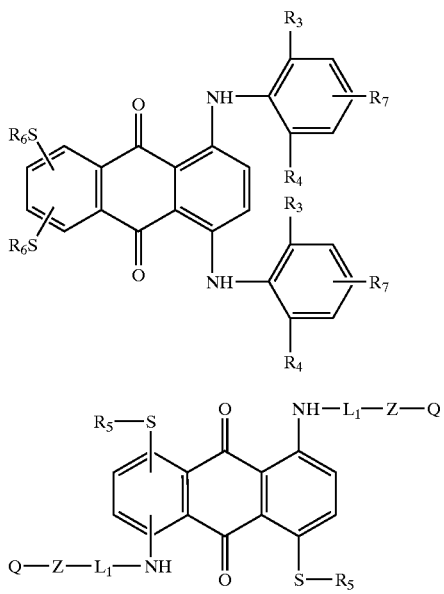
VI.
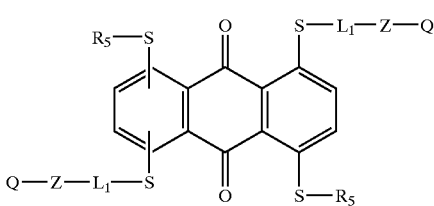
VII.
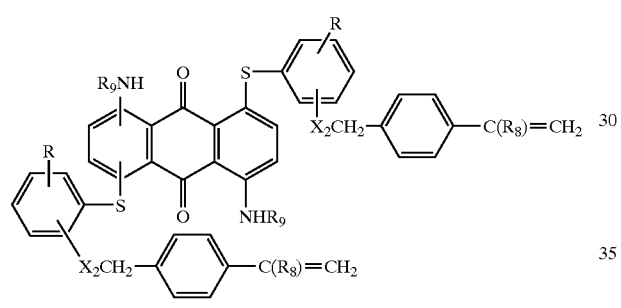
Red-Magenta Dyes
VIII.
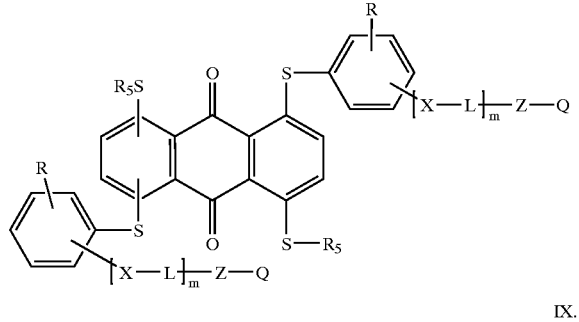
IX.
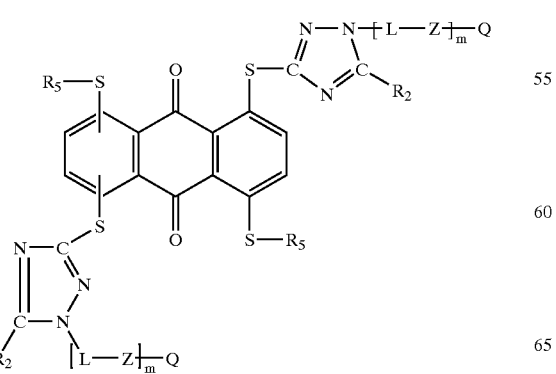
X.
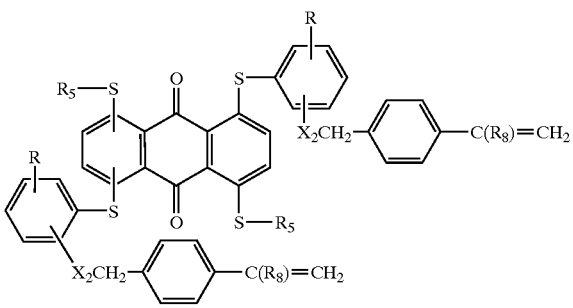
XI.
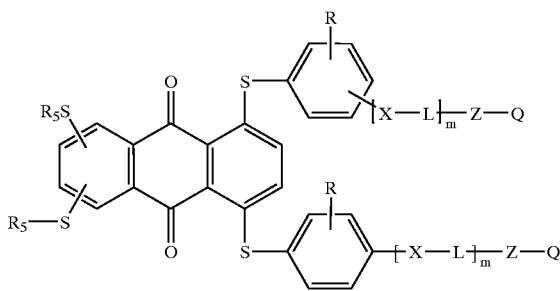
XII.
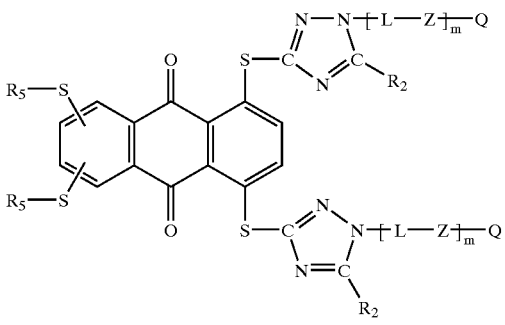
XIII.
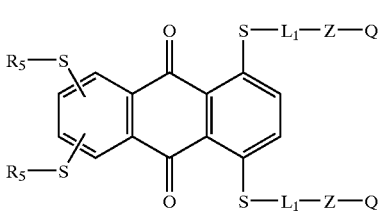
XIV.

XV.
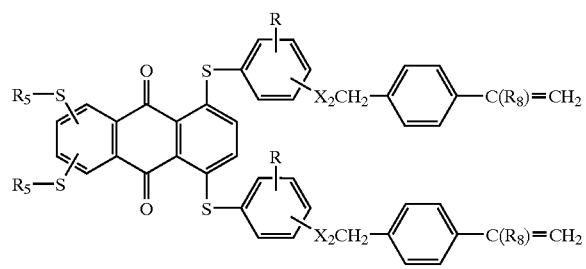

XVI.
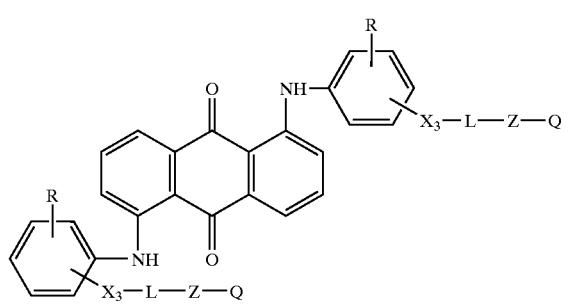

XVII.
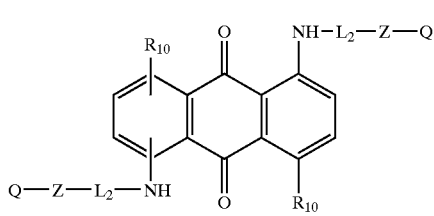

XVIII.
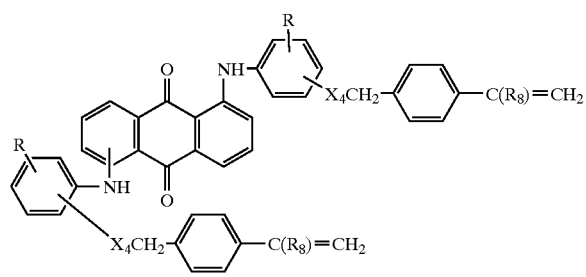

Yellow Dyes

XIX.
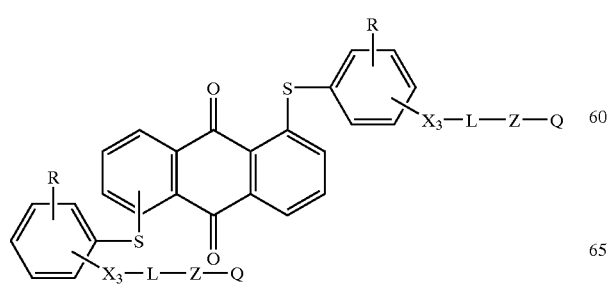

XX.
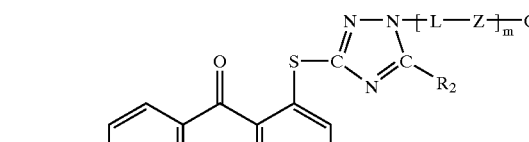

XXI.
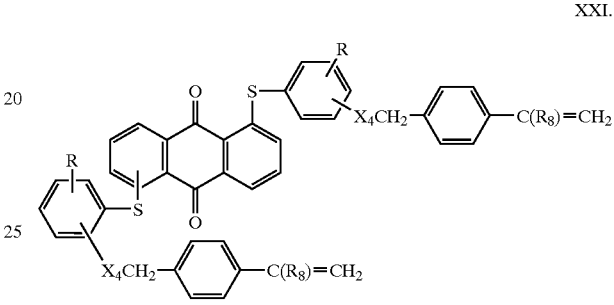

wherein

R is selected from hydrogen or 1–3 groups selected from $C_1$–$C_6$-alkyl, $C_1$–$C_6$-alkoxy and halogen;

$R_1$ is selected from $C_1$–$C_6$-alkyl, substituted $C_1$–$C_6$-alkyl, $C_3$–$C_8$-alkenyl, $C_3$–$C_8$-cycloalkyl, aryl and —$L_1$—Z—Q; $R_2$= selected from hydrogen, $C_1$–$C_6$-alkyl, substituted $C_1$–$C_6$-alkyl, $C_3$–$C_8$-cycloalkyl and aryl;

$R_3$ and $R_4$ are independently selected from $C_1$–$C_6$-alkyl and bromine;

$R_5$ is selected from $C_1$–$C_6$-alkyl, substituted $C_1$–$C_6$ alkyl, $C_3$–$C_8$-cycloalkyl, aryl, heteroaryl, —$L_1$—Z—Q,

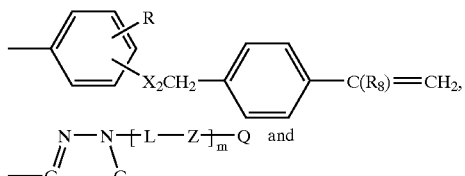

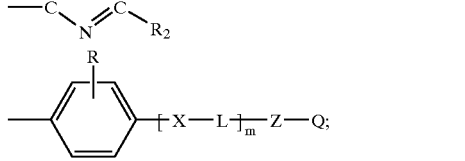 and

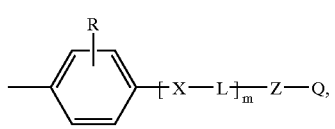

$R_6$ is selected from

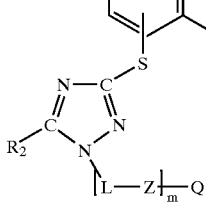

-continued

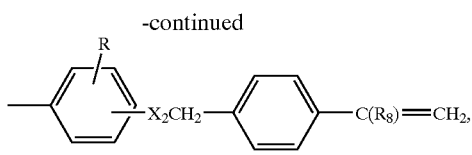

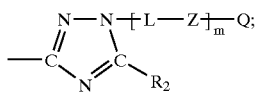

$R_7$ is selected from hydrogen, substituted or unsubstituted $C_1$–$C_6$-alkyl, $C_1$–$C_6$-alkoxy, halogen, hydroxy, substituted or unsubstituted $C_1$–$C_6$-alkylthio, sulfamoyl and substituted sulfamoyl;

$R_8$ is selected from hydrogen and $C_1$–$C_6$-alkyl;

$R_9$ is selected from the groups represented by $R_1$ and —L—Z—Q;

$R_{10}$ is selected from hydrogen and halogen;

X is a covalent bond or a divalent linking group selected from —O—, —S—, —$SO_2$—, —$CO_2$—, —CON(Y)— and —$SO_2$N(Y)—, wherein Y is selected from hydrogen, $C_1$–$C_6$-alkyl, substituted $C_1$–$C_6$-alkyl, $C_3$–$C_8$-cycloalkyl, $C_3$–$C_8$-alkenyl, aryl and —L—Z—Q;

$X_1$ is selected from —O—, —S—, —$SO_2$— and —$SO_2$N(Y)—;

$X_2$ is selected from —$CO_2$— and —$SO_2$N($Y_1$), wherein $Y_1$ is a group selected from hydrogen, $C_1$–$C_6$-alkyl, substituted $C_1$–$C_6$-alkyl, $C_3$–$C_8$-alkenyl, $C_3$–$C_8$-cycloalkyl, aryl heteroaryl and —$CH_2$-p-$C_6H_4$—C(R)$_8$=$CH_2$;

$X_3$ is selected from —$CO_2$—, —$SO_2$N(Y)—;

$X_4$ is selected from —$CO_2$—, —O— and —$SO_2$N($Y_1$)—;

L is a divalent linking group selected from $C_1$–$C_8$-alkylene, $C_1$–$C_6$-alkylene-arylene, arylene, $C_1$–$C_6$-alkylene-arylene-$C_1$–$C_6$-alkylene, $C_3$–$C_8$-cycloalkylene, $C_1$–$C_6$-alkylene-$C_3$–$C_8$-cycloalkylene-$C_1$–$C_6$-alkylene, $C_1$–$C_6$-alkylene-$Z_1$-arylene -$Z_1$—$C_1$–$C_6$-alkylene and $C_2$–$C_6$-alkylene-[—$Z_1$—$C_2$–$C_6$-alkylene-]$_n$— wherein $Z_1$ is selected from —O—, —S— and —$SO_2$ and n is 1–3;

$L_1$ is a divalent linking group selected from $C_2$–$C_6$-alkylene, $C_1$–$C_6$-alkylene-$C_3$–$C_8$-cycloalkylene-$C_1$–$C_6$-alkylene, $C_1$–$C_6$-alkylene-arylene, $C_3$–$C_8$-cycloalkylene, and $C_2$–$C_6$-alkylene-[—$Z_1$—$C_2$–$C_6$-alkylene-]$_n$—;

$L_2$ is selected from $C_2$–$C_6$-alkylene, $C_1$–$C_6$-alkylene-arylene-$C_1$–$C_6$ alkylene and $C_1$–$C_6$-alkylene-$C_3$–$C_8$-cycloalkylene-$C_1$–$C_6$-alkylene;

Z is a divalent group selected from —O—, —S—, —NH—, —N($C_1$–$C_6$-alkyl)-, —N($C_3$–$C_8$ alkenyl)-, —N($C_3$–$C_8$ cycloalkyl)-, —N(aryl)-, —N($SO_2C_1$–$C_6$-alkyl) and —N($SO_2$ aryl)-, provided that when Q is a photopolymerizable optionally substituted maleimide radical, Z represents a covalent bond; Q is an ethylenically-unsaturated, photosensitive polymerizable group; and m and $m_1$ each is O or 1.

The ethylenically-unsaturated, photosensitive copolymerizable groups represented by Q are selected from the following organic radicals:

Ia

IIa

IIIa

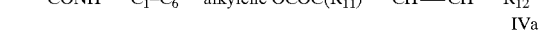
IVa

—COCH=CH—$CO_2R_{15}$
Va

VIa

VIIa

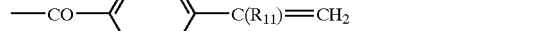
VIIIa

—$SO_2C(R_{11})$=$CH_2$
IXa

Xa

And

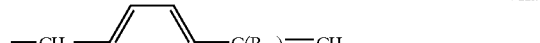
XIa

XIIa

XIIIa wherein:

$R_{11}$ is selected from hydrogen and $C_1$–$C_6$-alkyl;

$R_{12}$ is selected from hydrogen; $C_1$–$C_6$-alkyl; phenyl and phenyl substituted with one or more groups selected from $C_1$–$C_6$-alkyl, $C_1$–$C_6$-alkoxy, —N($C_1$–$C_6$-alkyl), nitro, cyano, $C_1$–$C_6$-alkoxycarbonyl, $C_1$–$C_6$-alkanoyloxy and halogen; 1- and 2-naphthyl which may be substituted with $C_1$–$C_6$-alkyl or $C_1$–$C_6$-alkoxy; 2- and 3-thienyl which may be substituted with $C_1$–$C_6$-alkyl or halogen; 2- or 3-furyl which may be substituted with $C_1$–$C_6$-alkyl;

$R_{13}$ and $R_{14}$ are selected from hydrogen, $C_1$–$C_6$-alkyl, substituted $C_1$–$C_6$-alkyl, aryl or may be combined to represent a —[—$CH_2$—]$_{3-5}$— radical;

$R_{15}$ is selected from hydrogen, $C_1$–$C_6$-alkyl, substituted $C_1$–$C_6$-alkyl, $C_3$–$C_8$-alkenyl, $C_3$–$C_8$-cycloalkyl and aryl;

$R_{16}$ is selected from hydrogen, $C_1$–$C_6$-alkyl and aryl.

The term "$C_1$–$C_6$-alkyl" is used herein to denote a straight or branched chain, saturated, aliphatic hydrocarbon radical containing one to six carbon atoms. The term "substituted $C_1$–$C_6$-alkyl" is used to denote a $C_1$–$C_6$-alkyl group substituted with one or more groups, preferably one to three groups, selected from the group consisting of hydroxy, halogen, cyano, aryl, aryloxy, arylthio, $C_1$–$C_6$ alkylthio, $C_3$–$C_8$-cycloalkyl, $C_1$–$C_6$-alkanoyloxy and —[—O—$R_{17}$—)—$R_{18}$, wherein $R_{17}$ is selected from the group consisting of $C_1$–$C_6$ alkylene, $C_1$–$C_6$-alkylene-arylene, cyclohexylene, arylene, $C_1$–$C_6$-alkylene-cyclohexylene and $C_1$–$C_6$-alkylene-cyclohexylene-$C_1$–$C_6$-alkylene;

$R_{18}$ is selected from the group consisting of hydrogen, hydroxy, carboxy, $C_1$–$C_6$-alkanoyloxy, $C_2$–$C_6$-alkoxycarbonyl, aryl and $C_3$–$C_8$-cycloalkyl; and p is 1, 2, or 3.

A second embodiment of the present invention pertains to a coating composition comprising (i) one or more polymerizable vinyl compounds, (ii) one or more of the dye compounds described above, and (iii) a photoinitiator. A third embodiment of the present invention pertains to a polymeric composition, typically a coating, comprising a polymer of one or more acrylic acid esters, one or more methacrylic acid esters and/or other polymerizable vinyl compounds, having copolymerized therein one or more of the dye compounds described above.

DETAILED DESCRIPTION

The terms "$C_1$–$C_6$-alkylene" and "$C_1$–$C_8$-alkylene" are used to denote straight or branched chain, divalent, aliphatic hydrocarbon radicals containing one to six and one to eight carbons, respectively, and these radicals substituted with one to three groups selected from $C_1$–$C_6$-alkoxy, $C_1$–$C_6$-alkoxycarbonyl, $C_1$–$C_6$-alkanoyloxy, hydroxy, aryl and halogen. Similarly, the term "$C_2$–$C_6$-alkylene" is used to denote a straight or branched chain, divalent, hydrocarbon radical which may be unsubstituted or substituted as described in this paragraph for the $C_1$–$C_6$-alkylene and $C_1$–$C_8$-alkylene radicals.

The terms "$C_1$–$C_6$-alkoxy", "$C_1$–$C_6$-alkoxycarbonyl", "$C_1$–$C_6$-alkanoyloxy" and "$C_1$–$C_6$-alkanoylamino" are used to denote radicals corresponding to the structures —$OR_{19}$, —$CO_2R_{19}$, —$OCOR_{19}$ and $NHCOR_{19}$, respectively, wherein $R_{19}$ is $C_1$–$C_6$-alkyl or substituted $C_1$–$C_6$-alkyl. The term "$C_3$–$C_8$-alkenyl" is used to denote an aliphatic hydrocarbon radical containing at least one double bond. The term "$C_3$–$C_8$-cycloalkyl" is used to denote a saturated, carbocyclic hydrocarbon radical having three to eight carbon which may be unsubstituted or substituted with one to three $C_1$–$C_6$-alkyl group(s). The term "$C_3$–$C_8$-cycloalkylene" is used to denote a carbocyclic, divalent hydrocarbon radical which contains three to eight carbon atoms, preferably five or six carbons.

The term "aryl" as used herein denotes phenyl and phenyl substituted with one to three substituents selected from $C_1$–$C_6$-alkyl, substituted $C_1$–$C_6$-alkyl, $C_1$–$C_6$alkoxy, halogen, carboxy, cyano, $C_1$–$C_6$-alkanoyloxy, $C_1$–$C_6$-alkylthio, $C_1$–$C_6$alkylsulfonyl, trifluoromethyl, hydroxy, $C_1$–$C_6$-alkoxycarbonyl, $C_1$–$C_6$ alkanoylamino and —O—$R_{20}$, S—$R_{20}$, —$SO_2$—$R_{20}$, —$NHSO_2R_{20}$ and —$NHCO_2R_{20}$, wherein $R_{20}$ is phenyl or phenyl substituted with one to three groups selected from $C_1$–$C_6$-alkyl, $C_1$–$C_6$-alkoxy and halogen. The term "arylene" as used herein denotes includes 1,2-, 1,3- and 1,4-phenylene and such divalent radicals substituted with one to three groups selected from $C_1$–$C_6$-alkyl, $C_1$–$C_6$-alkoxy and halogen. The term "heteroaryl" as used herein denotes a 5- or 6-membered aromatic ring containing one to three hetero atom selected from oxygen, sulfur and nitrogen. Examples of such heteroaryl groups are thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, pyridyl, pyrimidyl, benzoxazolyl, benothiazolyl, benzimidazolyl, indolyl and the like. The heteroaryl radicals may be substituted with one to three groups selected from $C_1$–$C_6$-alkyl, $C_1$–$C_6$-alkoxy, substituted $C_1$–$C_6$-alkyl, halogen, $C_1$–$C_6$-alkylthio, aryl, arylthio, aryloxy, $C_1$–$C_6$-alkoxycarbonyl and $C_1$–$C_6$-alkanoylamino.

The term "halogen" is used to include fluorine, chlorine, bromine, and iodine. The terms "sulfamoyl and substituted sulfamoyl" denote radicals having the structure —$SO_2$N($R_{21}$)$R_{22}$, wherein $R_{21}$, and $R_{22}$ are independently selected from hydrogen, $C_1$–$C_6$-alkyl, substituted $C_1$–$C_6$-alkyl, $C_3$–$C_8$-alkenyl, $C_3$–$C_8$-cycloalkyl, aryl and heteroaryl.

The preferred dye compounds of Formulae I, II, III, IV, V, VI, VIII, IX, X, XII, XIII, XIV, XVI, XVII, XIX, and XX are those where Z is —O—. These dyes are prepared by reacting the corresponding dihydroxy dye [Dye (OH)$_2$] with a reagent to introduce the reactive vinyl functionality. For example, the dyes wherein Q corresponds to structure Ia, VIa, XIa, respectively, are prepared by reacting the dihydroxy dyes with the corresponding acid chlorides and/or anhydrides as follows:

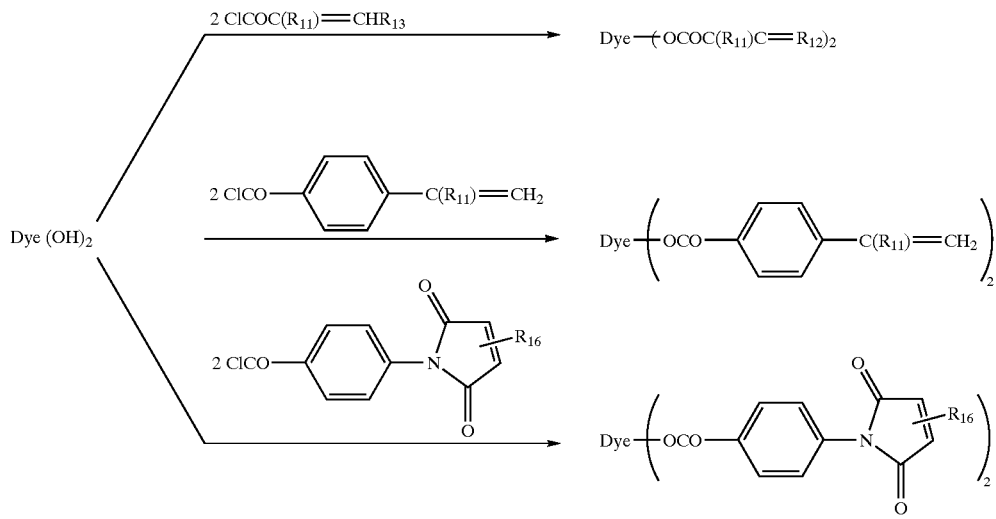

The dyes wherein Z is —O— and Q corresponds to structures IIa, IIIa, and VIIIa are prepared by reacting the dihydroxy dyes with the corresponding isocyanates:

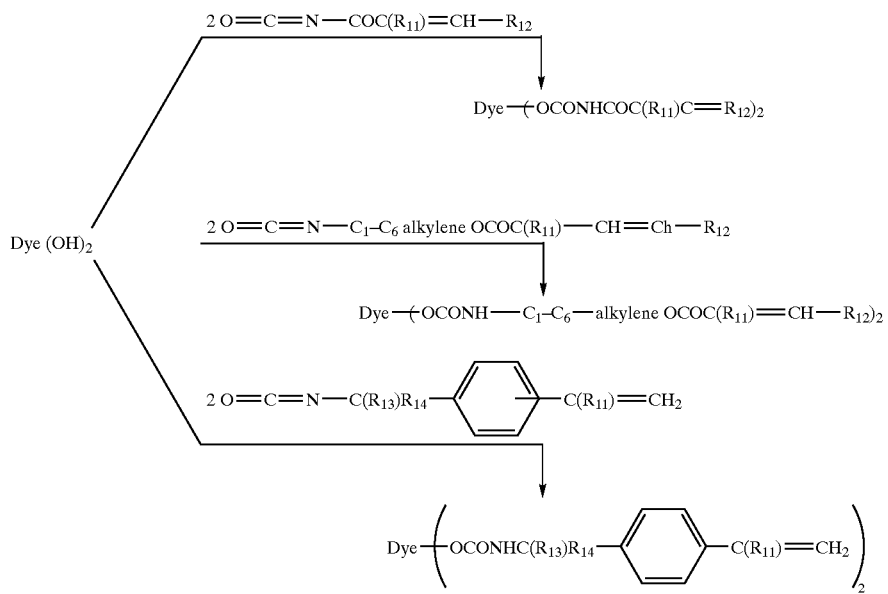

The dyes were Z is —O— and where Q corresponds to structure IVa are prepared by reacting the dihydroxy dyes with 2-alkenylazlactones as generally described in Encyclopedia of Polymer Science and Eng., Second Ed., Vol. 11, John Wiley & Sons, pp. 558–571:

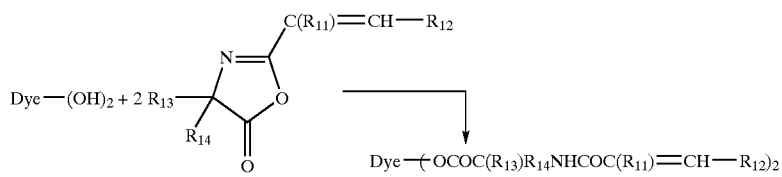

The dyes wherein Z is —O— and Q corresponds to structure Va are generally prepared by reacting the dihydroxy dyes with maleic anhydride to give the mono maleate esters:

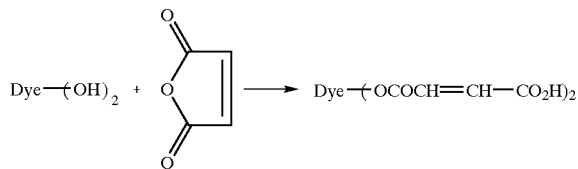

The remaining acid groups may be esterified by the usual type esterification reactions such as heating in alcohols in the presence of acid catalysts and reacting the alkali metal salts of the acids with alkylating agents such as alkyl halides, alkyl sulfates and alkyl sulfonates, such as methyl 4-toluene sulfonate, to prepare the methyl ester. Fumaric acid and its derivatives also may be used to prepare the dyes where Q is radical Va. Itaconic anhydride (methylenesuccinic anhydride) may be used to react with the dihydroxy dyes to prepare the functionalized dyes wherein Z is —O— and Q corresponds to structure XIIa ($R_{15}$=H). These acidic compounds may be esterified as described above for preparing the dyes where Q corresponds to structure Va.

Anthraquinone dyes containing aliphatic hydroxy groups useful for reacting as described above to produce dyes containing reactive Q groups are disclosed in U.S. Pat. Nos. 4,267,306, 4,359,570, 4,403,092, 4,804,719, 4,999,418, 5,032,670, 5,194,463, 5,372,864, 5,955,564 and 5,962,557. Anthraquinone dyes containing 1(H)-1,2,4-triazol-3ylthio groups which are useful in preparing dyes of Formulae III, IX, XIII and XX are disclosed in U.S. Pat. Nos. 3,689,501, 4,267,306, 5,962,557 and 6,197,223. Anthraquinone dyes containing carboxy groups and which are useful in the practice of the invention are disclosed in U.S. Pat. Nos. 4,359,570, 4,403,092, 4,999,418, 5,372,864, 5,955,564, 5,962,557 and U.S. Pat. No. 6,197,223. Hydroxy alkyl groups may be introduced into these compounds by alkylation of the acids with hydroxyalkyl halides or alkylene carbonates to give the hydroxyalkyl derivatives useful for reacting further as shown herein to introduce reactive Q groups.

To prepare the dyes wherein Z is —S—, —NH—, —N($C_1$–$C_6$ alkyl)-, —N($C_3$–$C_8$ alkenyl)-, —N($C_3$–$C_8$ cycloalkyl)-, —N(aryl)-, —N($SO_2$ $C_{1-C6}$ alkyl)- and —N($SO_2$ aryl)-, the corresponding anthraquinone dyes containing two of the following nucleophilic ZH groups, respectively, are reacted with the reagents mentioned above for preparing the dyes where Z=—O—: —SH, —NH ($C_1$–$C_6$ alkyl), —NH($C_3$–$C_8$ alkenyl), —NH($C_3$–$C_8$ cycloalkyl), —NH(aryl)-, NH(SO2 $C_1$–$C_6$ alkyl) and —NH ($SO_2$ aryl). All of the dyes mentioned above containing two ZH groups may be reacted with vinylsulfonyl halides to prepare dyes where Q=—$SO_2C(R_{11})$=$CH_2$ (Structure IXa). When Q corresponds to Structure IXa, the preferred Z group is —NH—. Dyes wherein Q corresponds to structure Xa and XIIIa and Z is a covalent bond are prepared by reacting dyes containing two primary amine groups with, for example, maleic anhydride and itaconic anhydride, respectively.

The functionalized dyes of Formulae VII, XI, XV, XVIII and XXI wherein $X_2$ and $X_4$ are —$CO_2$— are prepared by alkylating the intermediate dye containing two carboxy groups with an alkylating agent having the structure $ClCH_2$-p-$C_6H_4$—C($R_8$)=$CH_2$, with 4-vinylbenzyl chloride ($R_8$=H) being particularly preferred. The reaction is easily accomplished in the presence of alkali metal carbonates and trialkyl amines as bases. The functionalized dyes corresponding to Formulae III, IX, XIII and XX wherein m is 0 are prepared by reacting the intermediate dyes containing two 1(H)-1,2,4-triazol-3ylthio groups with an alkylating agent having the structure $ClCH_2$-p-$C_6H_4$—C($R_8$)=$CH_2$, with 4-vinylbenzyl chloride ($R_8$=H) being preferred, in the presence of a base such as alkali metal carbonates or trialkylamines.

A group of preferred anthraquinone compounds comprise compounds having structures XVI and XIX wherein $X_3$ is —$CO_2$—, L is propylene, 1,4-cyclo-hexylenedimethylene or 2,2-dimethyltrimethylene, R is hydrogen, Z is —O—, and Q is an organic radical having the structure —COC($R_{11}$)=$CH_2$ wherein $R_{11}$ is hydrogen, methyl or ethyl, or Q is an organic radical having structure VIIIa wherein $R_{11}$, $R_{13}$ and $R_{14}$ each is methyl.

The yellow, red-magenta, blue-cyan dyes of this invention are particularly useful for making combination shades as subtractive colors. They have particular value for copolymerizing into acrylic polymeric materials by free radical polymerization, having one or more advantages over the prior art dyes such as thermal stability, solubility in the acrylate or methacrylate ester comonomer(s) to be used, fastness to UV light, color strength, ease of manufacture and the like. The dyes of this invention are particularly useful for providing acrylic polymer color coatings for glass optical fibers where good thermal stability of dyes is required.

COLORANT EXAMPLES

The copolymerizable dye compounds provided by the present invention and the preparation thereof are further illustrated by the following examples.

Example 1

A mixture of 1,5-bis-(2-carboxyphenylthio) anthraquinone (U.S. Pat. No. 4,359,570, Example 1) (5.13 g, 0.01 mol), potassium carbonate (2.84 g, 0.02 mol) and N,N-dimethylformamide (DMF, 100 mL) was stirred and heated to about 100° C. To the stirred mixture, was added 4-vinylbenzyl chloride (Aldrich, 3.76 g, 0.022 m). Thin-layer chromatography (TLC) using a 50/50 mixture of tetrahydrofuran(THF)/cyclohexane after heating the reaction mixture at about 105° C. for 30 min. showed only one spot with no starting material or mono-reacted product being observed. The reaction mixture was heated for an additional 20 minutes and the yellow dye precipitated by the addition of a mixture of methanol and water. The solid dye was collected by filtration, washed with water and then with a little methanol. The yield of air-dried product was 6.85 g (92% of the theoretical yield). Field desorption mass spectrometry (FDMS) supported the following structure:

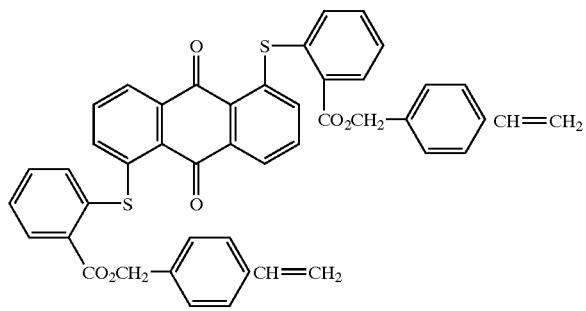

An absorption maximum at 447 nm was observed in the UV-visible absorption spectrum in DMF.

Example 2

A mixture of 1,5-bis-(2-carboxyanilino) anthraquinone (U.S. Pat. No. 4,359,570, Example 2) (4.78 g, 0.01 mol), potassium carbonate (2.76 g, 0.02 mol) and DMF (100 mL) was stirred and heated to about 90° C. and 4-vinylbenzyl chloride (Aldrich, 3.76 g, 0.022 mol) was added and heating and stirring continued at about 100° C. for 60 min. TLC (50/50 THF/cyclohexane) showed complete reaction. Methanol (120 mL) was added gradually with stirring to precipitate the red product, which was collected by filtration, washed with water and then dried in air (yield–6.18 g, 87% of the theoretical yield). FDMS supports the following structure:

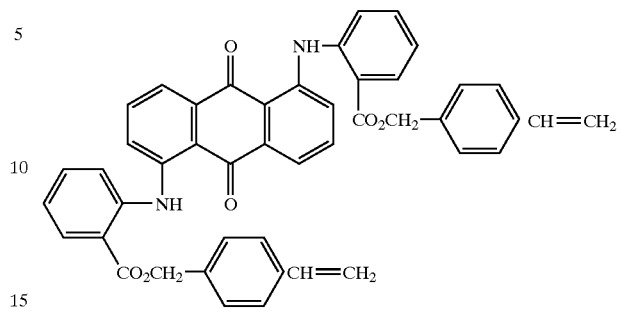

Example 3

A mixture of 1,5-bis-(isobutylamino)-4,8-bis-(2-carboxyphenylthio) anthraquinone (U.S. Pat. No. 6,197,223, Example 2) (6.54 g, 0.01 mol), potassium carbonate (2.76 g, 0.02 m) and DMF (150 mL) was stirred and heated to about 100° C. To the stirred reaction mixture was added 4-vinylbenzyl chloride (3.76 g, 0.02 mol). The reaction mixture was heated at 95–100° C. for about 60 minutes The reaction mixture was cooled and the gummy product was drowned out by the addition of methanol/water. The liquid was decanted off and the product triturated with methanol. The resulting dark blue solid was collected by filtration, washed with methanol and dried in air (yield–6.95 g, 78% of the theoretical yield). FDMS supported the following structure:

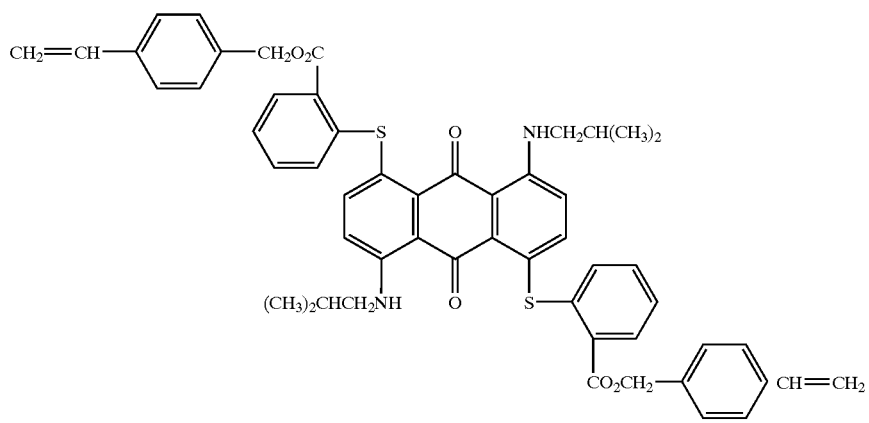

Absorption maxima at 600 nm and 645 nm were observed in the UV-visible absorption spectra in DMF.

Example 4

A mixture of 1,5-bis-(2-carboxyphenylthio)-4,8-bis-(4-tolylthio)-anthra-quinone (U.S. Pat. No. 6,197,223) (7.56 g, 0.01 mol), potassium carbonate ($K_2CO_3$) and DMF (300 mL) was stirred and heated to about 100° C. and then 4-vinylbenzyl chloride (3.84 g, 0.025 mol) was added. The reaction mixture was heated and stirred at about 100° C. for 60 minutes. TLC (50/50 THF/cyclohexanol) showed complete reaction. After cooling, the sticky product was obtained by drowning the reaction mixture with methanol/water. The red product solidified upon standing in contact with methanol and was collected by filtration and dried in air (yield–7.67 g, 78% of the theoretical yield). FDMS supported the following structure:

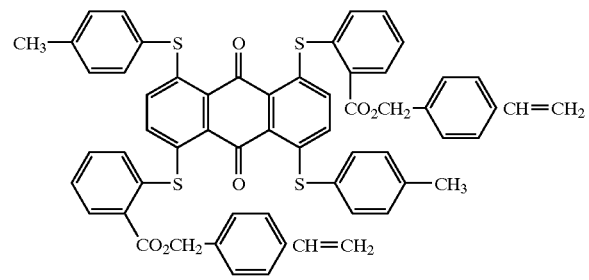

An absorption maximum was observed at 520 nm in the UV-visible absorption in DMF.

Example 5

A mixture of 1,5-bis-[(1H)-1,2,4-triazol-3ylthio)] anthraquinone (U.S. Pat. No. 3,689,501) (4.06 g, 0.01 mol), potassium carbonate (2.76 g, 0.02 mol) and DMF (100 mL) was stirred and heated to about 100° C. and 4-vinylbenzyl chloride (3.76 g, 0.022 mol) was added. TLC (50/50 THF/cyclohexane) still showed some mono-substituted product after heating the reaction mixture for 2 hrs. Additional quantities of 4-vinylbenzyl chloride (4.14 g) and potassium chloride (1.38 g) were added and heating continued for another hour to complete the reaction. A gummy yellow solid was produced by drowning the cooled reaction mixture with water. The product was washed by decantation with water and then dissolved in DMF. The DMF solution was drowned gradually into cold water with good stirring and the yellow solid was collected by filtration and dried in air (3.46 g, 54% of the theoretical yield). FDMS supported the following structure:

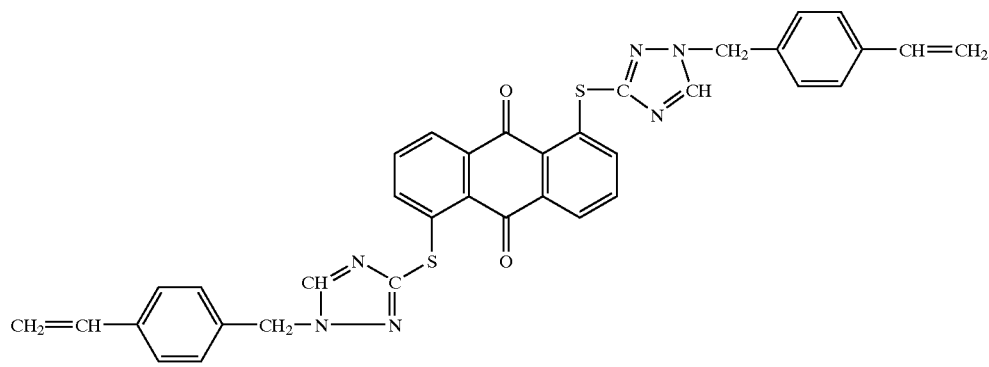

An absorption maximum at 420 nm was observed in the UV-visible absorption spectrum in DMF.

Example 6

A mixture of 1,5-bis-(2,2-dimethyl-3-hydroxypropylamino) anthraquinone (U.S. Pat. No. 4,999,418, Example 1) (4.10 g, 0.01 mol), DMF (25 mL) and 3-isopropenyl-$\alpha,\alpha$-dimethylbenzyl isocyanate (Aldrich; 5 mL, 0.025 mol) was heated and stirred at about 75° C. for 48 hrs. TLC (50/50-THF/cyclohexane) showed all of the starting material to be reacted and a mixture of the desired product plus the mono-reaction product. After addition of an additional quantity (1 mL) of 3-isopropenyl-$\alpha,\alpha$-dimethylbenzyl isocyanate, the reaction mixture was heated and stirred at about 90° C. for 12 hrs. Triethylamine (0.5 mL) was added and the reaction mixture was stirred at about 100° C. for another 24 hrs. The cooled reaction mixture was drowned into water (200 mL) to produce a sticky solid which hardened upon standing. The water was decanted off and the solid redissolved in DMF (200 mL) by heating on a steambath. Water (50 mL) was added gradually to the hot DMF with stirring. After allowing to stand overnight a red solid had formed. Additional water (150 mL) was added and the product was collected by filtration, washed with water and dried in air. Essentially a quantitative yield of the following product was obtained:

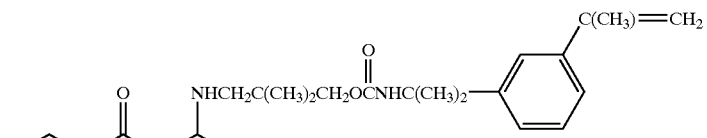
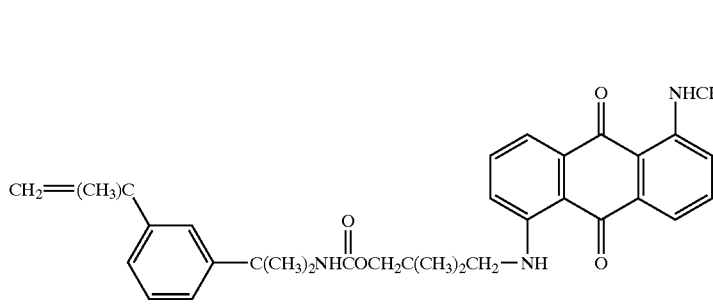

which was soluble in methanol, methylene chloride and somewhat soluble in hexane.

Example 7a

A mixture of 1,5-bis-(2-carboxyphenylthio)anthraquinone (U.S. Pat. No. 4,359,570, Example 1) (30.6 g, 0.06 mol), ethylene carbonate (88.0 g, 1.0 mol), ethylene glycol (50 mL) and pulverized potassium iodide (5.2 g) was heated and stirred at about 125° C. for about 2.0 hours and then allowed to cool. The reaction mixture was drowned into cold water (150 mL) with stirring. The yellow solid was collected by filtration, washed with warm water and dried in air (yield–35.2 g, 97.8% of the theoretical yield). FDMS supported the following structure:

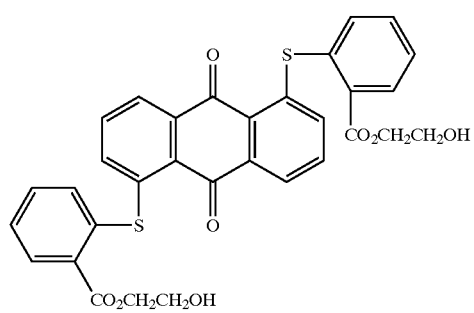

Example 7b

A mixture of the product of Example 7a (6.0 g, 0.01 mol), DMF (25 mL) and 3-isopropenyl-α,α-dimethylbenzyl isocyanate (6 mL, 0.03 mol) was heated and stirred, under nitrogen at about 95–100° C. for about 48 hours. Triethylamine (0.5 mL) was added and heating continued for an additional 48 hours. Water (60 mL) was added portionwise to the hot reaction mixture with stirring. After allowing to cool to room temperature, the yellow product was collected to filtration, washed with water and dried in air. Essentially a quantitative yield of the following product was obtained:

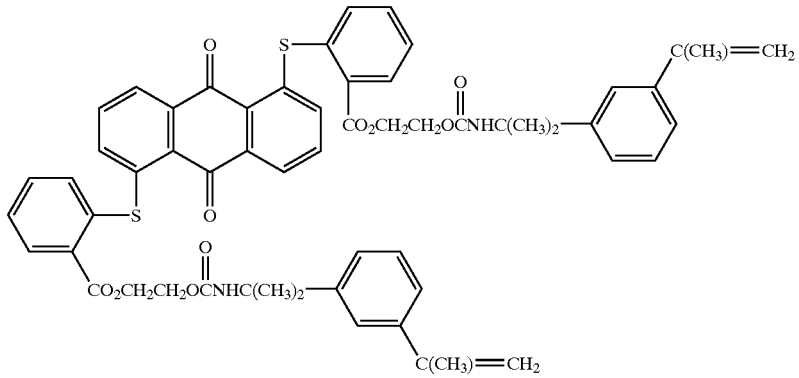

Example 8

A mixture of 1,5-bis-(2,2-dimethyl-3-hydroxypropylamino) anthraquinone (U.S. Pat. No. 4,999,418, Example 1) (1.0 g, 2.44 mmol) and toluene (50 mL) was prepared and then most of the toluene was evaporated under reduced pressure to remove any water present. DMF (50 mL), hydroquinone (50 mg), 4-(dimethyl-amino)pyridine (DMAP; 59.6 mg), triethylamine (1.0 mL) and methacrylic anhydride (1.33 g, 7.32 mmol) were added and the reaction mixture was stirred at room temperature for about 20 hours. TLC (50/50 hexane/ethyl acetate) indicated complete reaction. The reaction mixture was poured into water (300 mL) and the red product was collected by filtration, washed with water and dried in vacuo (yield–1.30 g, 98% of the theoretical yield). FDMS supported the following structure:

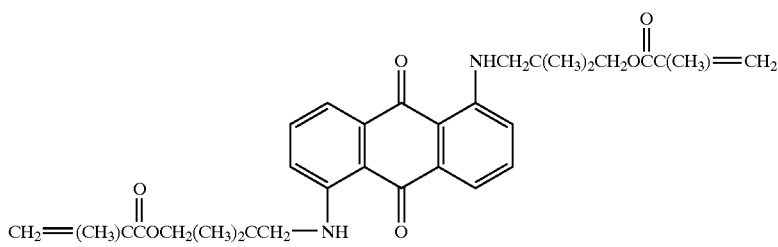

The functionalized red dye had an absorption maximum at 526 nm in DMF solution in the UV-visible absorption spectrum.

Example 9

The dye of Example 7a above (2.0 g, 3.33 mmol) and toluene (20 mL) were mixed and stirred while most of the toluene was removed under reduced pressure. DMF (50 mL), DMAP (82 mg), triethylamine (1.4 mL), hydroquinone (50 mg) and methacrylic anhydride (1.53 g, 9.99 mmol) were added and the reaction mixture stirred at room temperature for 15 hours. The yellow functionalized dye which was precipitated by drowning into water (200 mL) and allowing to stand for several days was collected by filtration, washed with water and 1:1 methanol: water and dried in vacuo. The yield was 2.23 g (91% of the theoretical yield). FDMS supported the following structure:

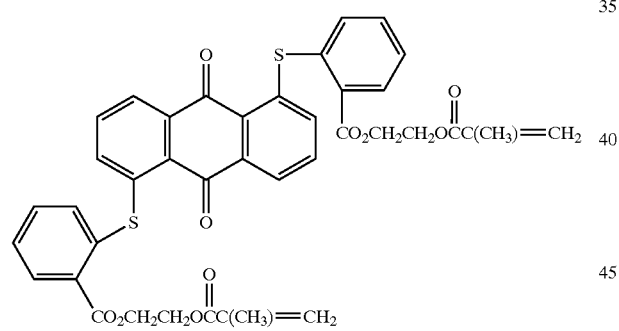

An absorption maximum at 444 nm was observed in the UV-visible absorption spectrum in DMF.

Example 10a

A mixture of 1,5-bis-(carboxyanilino) anthraquinone (U.S. Pat. No. 4,359,570, Example 2) (59.75 g, 0.125 mol), ethylene carbonate (165 g, 1.875 mol), ethylene glycol (550 mL) and pulverized potassium iodide (11.3 g) was heated at 120–125° C. for 6.5 hours -and the mixture allowed to cool. Methanol (400 mL) was added to the stirred reaction mixture. The red solid was collected by filtration, washed with water and dried in air (yield–69.5 g, 98.2% of the theoretical yield). FDMS supported the following structure:

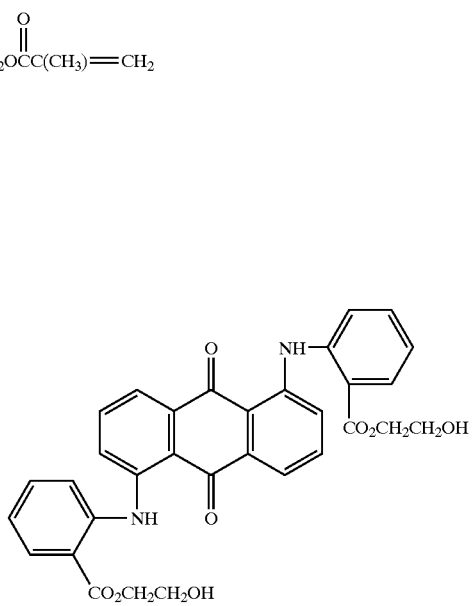

Example 10b

A portion (2.0 g, 3.53 mmol) of the dye of Example 10a above was mixed with toluene (10 mL) and most of the toluene removed under vacuum. DMF (50 mL), DMAP (86 mg), triethylamine (1.5 mL), hydroquinone (20 mg) and methacrylic anhydride (1.63 g, 10.6 mmol) were added and the resulting solution was stirred for 15 hours at room temperature. The reaction mixture was drowned into water (200) and allowed to stand at room temperature for several days. The functionalized red dye was collected by filtration, washed with water and dried in vacuo (yield–2.10 g. 85% of the theoretical yield). FDMS supported the following structure:

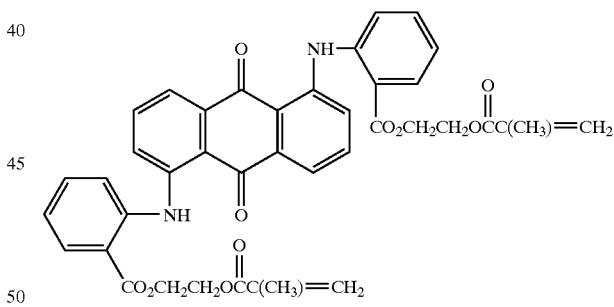

An absorption maximum at 525 nm was observed in DMF solution in the UV-visible absorption spectrum.

Example 11

A mixture of 1,5-bis-(2,2-dimethly-3-hydroxypropylamino)-4,8-bis-(tolylthio)anthraquinone (U.S. Pat. No. 5,955,564) (2.0 g, 3.06 mmol) and toluene (10 mL) was stirred and most of the toluene removed under vacuum. DMF (50 mL), triethylamine (1.3 mL), DMAP (75 mg), hydroquinone (20 mg) and methacrylic anhydride (1.41 g, 9.18 mmol) were added and the reaction mixture was stirred at room temperature for 15 hours. After drowning into water (200 mL) and allowing the mixture to stand for several days the functionalized blue dye was collected by filtration, washed with water and dried in vacuo. Essentially a quantitative yield was obtained. FDMS supported the following structure:

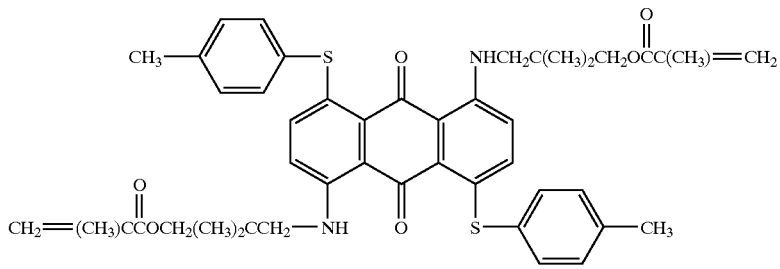

An absorption maximum at 650 nm was observed in DMF solution in the UV-visible light absorption spectrum.

Example 12

A mixture of 1,5-bis-[5-(N-ethyl-N-(2-hydroxyethyl)sulfamoyl)-2-methoxyanilino]anthraquinone (U.S. Pat. No. 5,372,864, Example 21) (2.0 g, 2.66 mmol) and toluene (10 mL) was stirred and most of the toluene was removed under reduced pressure. DMF (50 mL), DMAP (65 mg), triethylamine (1.1 mL), hydroquinone (20 mg) and methacrylic anhydride (1.22 g, 7.98 mmol) were added and the reaction mixture was stirred overnight at room temperature for about 15 hours. The functionalized blue dye was precipitated by drowning into water (200 mL) and allowing the mixture to stand for several days at room temperature and was collected by filtration washed with water and dried in vacuo. Essentially a quantitative yield was obtained. FDMS supported the following structure:

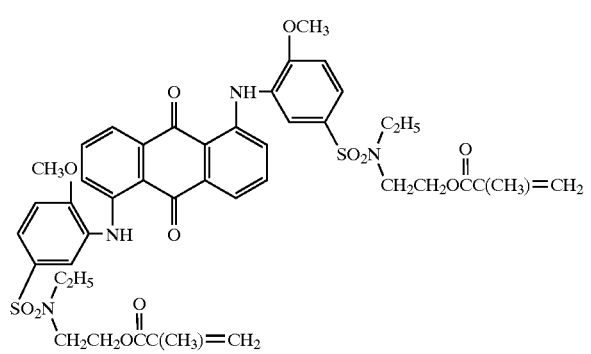

An absorption maximum at 527 nm in DMF solution was observed in the UV-visible absorption spectrum.

Example 13

A portion (2.0 g, 3.53 mmol) of the dye from Example 10a above was mixed with toluene and stirred while most of the toluene was removed under reduced pressure. DMF (50 mL), DMAP (86 mg), triethylamine (1.5 mL), hydroquinone (20 mg) and crotonic anhydride (1.63 g, 10.6 mmol) were added and the reaction mixture was stirred for 24 hours. The functionalized red dye was isolated by drowning into water (200 mL), allowing the mixture to stand for a little while and then collecting by filtration. After washing with water the dye was dried in vacuo (yield–2.11 g, 85% of the theoretical yield). FDMS supported the following structure:

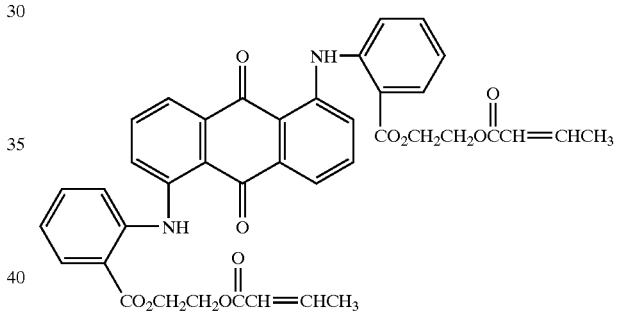

An absorption maximum at 522 nm in DMF solution was observed in the UV-visible light absorption spectrum.

Example 14

A mixture of 1,5-bis-(2,2-dimethyl-3-hydroxypropylamino)-4,8-bis-(4-tolylthio) anthraquinone (U.S. Pat. No. 5,955,564) (2.0 g, 3.06 mmol) and toluene (10 mL) was stirred and most of the toluene removed under reduced pressure. DMF (50 mL), DMAP (75 mg), triethylamine (1.3 mL), hydroquinone (20 mg) and crotonic anhydride (1.41 g, 9.18 mmol) were added. The reaction mixture was stirred at room temperature for 24 hours and then drowned into water (200 mL). After allowing the mixture to stand for awhile, the functionalized blue dye was collected by filtration, washed with water and dried in vacuo. The yield was essentially quantitative. FDMS supported the following structure:

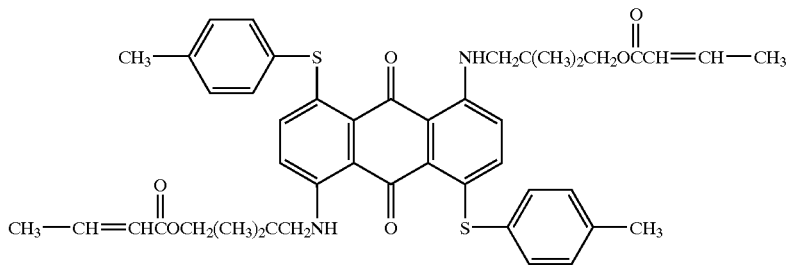

An absorption maximum at 650 nm was observed in DMF in the UV-visible absorption spectrum.

Example 15

A mixture of 1,5-bis-[5-(N-ethyl-N-(2-hydroxyethyl) sulfamoyl-2-methoxyanilino]-anthraquinone (U.S. Pat. No. 5,372,864, Example 21) (2.0 g, 2.66 mmol) and toluene (10 mL) were stirred and most of the toluene removed under reduced pressure. DMF (50 mL), DMAP (65 mg), triethylamine (1.1 mL), hydroquinone (20 mg) and crotonic anhydride (1.23 g, 7.98 mmol) were added. After being stirred at room temperature for 24 hours the reaction mixture was drowned into water (200 mL) and the mixture allowed to stand for awhile. The functionalized red dye was collected by filtration, washed with water and dried in vacuo. The yield was 1.96 g of product (83% of the theoretical yield). FDMS supported the following structure:

An absorption maximum at 529 nm was observed in the UV-visible light absorption spectrum.

Example 16

A mixture of 1,5-bis-(2,2-dimethyl-3-hydroxypropylamino) anthraquinone (U.S. Pat. No. 4,999,418, Example 1) (2.0 g, 4.88 mmol) and toluene (10 mL) was stirred and most of the toluene was removed under reduced pressure. DMF (50 mL), DMAP (120 mg), triethyl amine (2.0 mL) and crotonic anhydride (2.25 g, 14.6 mmol) were added. The reaction mixture was stirred at room temperature for 24 hours and then drowned into water (200 mL) and the mixture allowed to stand awhile. The functionalized red dye was collected by filtration, washed with water and dried in vacuo. The yield was 2.24 g (98% of the theoretical yield). FDMS supported the following structure:

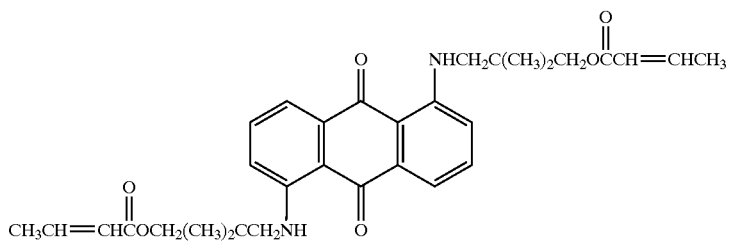

An absorption maximum at 527 nm was observed in the UV-visible light spectrum in DMF as the solvent.

Example 17

A mixture of a portion (2.0 g, 3.33 mmol) of the dye of Example 7a above and toluene (10 mL) was stirred and most of the toluene removed under vacuum. DMF (50 mL), DMAP (86 mg) triethylamine (1.4 mL), hydroquinone (20 mg) and crotonic anhydride (7.54 g, 9.99 mmol) were added. The reaction mixture was stirred at room temperature for 24 hours and drowned into water (200 mL) with stirring. The mixture was allowed to stand awhile and the functionalized yellow dye was collected by filtration, washed with water and dried in vacuo (yield 2.01 g, 82% of the theoretical yield). FDMS supported the following structure:

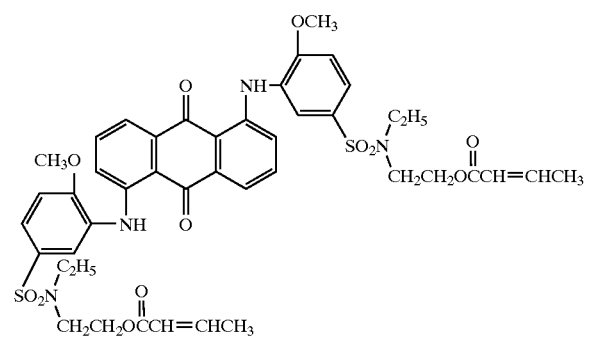

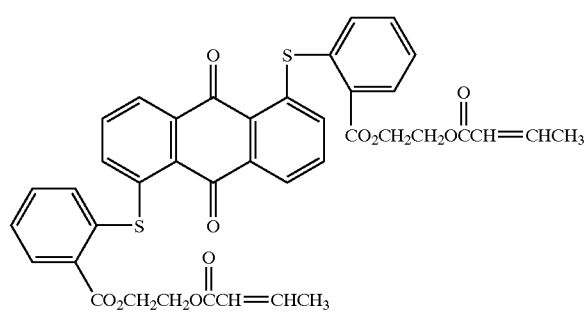

An absorption maximum at 446 nm was observed in DMF in the UV-visible light absorption spectrum.

Example 18

A mixture of 1,5-bis-(2,2-dimethyl-3-hydroxypropylamino) anthraquinone (U.S. Pat. No. 4,999, 418, Example 1) (1.0 g, 2.44 mmol) and toluene (50 mL) was stirred and most of the toluene removed under reduced pressure. DMF (50 mL), DMAP (60 mg), triethylamine (1.0 mL), hydroquinone (50 mg) and cinnamoyl chloride (Aldrich; 1.22 g, 7.35 mmol) were added. The reaction mixture was stirred at about 50° C. temperature for about 12 hours and then drowned into water (100 mL). The functionalized red dye was collected by filtration, washed with water and dried in vacuo (yield–1.61 g, 99% of the theoretical yield). FDMS supports the following structure:

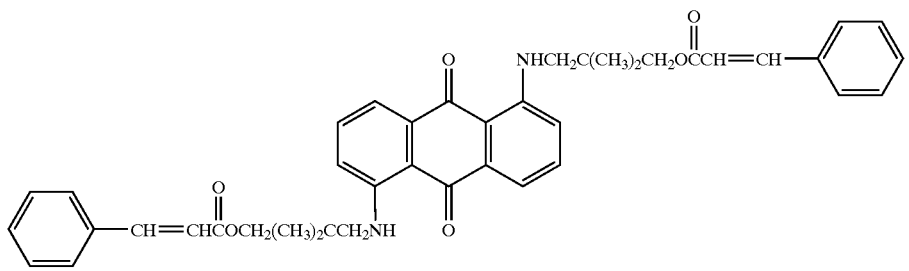

An absorption maximum at 527 nm was observed in DMF in the UV-visible absorption spectrum.

The functionalized dyes or colorants which contain vinyl or substituted vinyl groups are polymerizable or copolymerizable, preferably by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material which contains one or more vinyl or substituted vinyl groups.

The second embodiment of the present invention is a coating composition comprising (i) one or more polymerizable vinyl compounds, i.e., vinyl compounds which are copolymerizable with the dye compounds described herein, (ii) one or more of the dye compounds described above, and (iii) at least one photoinitiator. The polymerizable vinyl compounds useful in the present invention contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated and propoxylated bisphenol A, ethoxylated and propoxylated neopentyl glycol; triacrylate and trimethacrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers which contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints*, Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. A second embodiment for the utilization of unsaturated polyesters that is known to the art involves the combination of the unsaturated polyester with monomers that contain two or more vinyl ether groups or two or more vinyl ester groups (WO 96/01283, WO 97/48744, and EP 0 322 808).

The coating compositions of the present invention optionally may contain one or more added organic solvents if desired to facilitate application and coating of the compositions onto the surface of substrates. Typical examples of suitable solvents include, but are not limited to ketones, alcohols, esters, chlorinated hydrocarbons, glycol ethers, glycol esters, and mixtures thereof. Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxypropionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, and mixtures thereof. The amount of added or extraneous solvent which may be present in our novel coating compositions may be in the range of about 1 to 70 weight percent, more typically about 1 to 25 weight percent, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent is optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 weight percent, preferably about 75 to about 90 weight percent of the total coating composition.

The coating compositions of the present invention contain one or more of the reactive vinyl dye compounds described herein. The concentration of the dye compound or compounds may be from about 0.005 to 30.0, preferably from about 0.05 to 15.0, weight percent based on the weight of the polymerizable vinyl compound(s) present in the coating composition, i.e., component (i) of the coating compositions. The coating compositions of the present invention normally contain a photoinitiator. The amount of photoinitiator typically is about 1 to 15 weight percent, preferably about 3 to about 5 weight percent, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl) propan-1-one (IRGACURE 907), alpha-hydroxyalkylphenones such as (1-hydroxycyclohexyl) (phenyl)-methanone (IRGACURE 184), 2-benzyl-2-(dimethylamino)-1-(4-morpholinophenyl)butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVATONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)-phenylphosphine oxide (Irganox 819), Irgacure 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose.

Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, 18-07, 18-92 and 18-99 from Eastman Chemical Company. Specific examples of additional additives can be found in *Raw Materials Index*, published by the National Paint & Coatings Association, 1500 Rhode Island Avenue, N.W., Washington, D.C. 20005.

The third embodiment of the present invention pertains to a polymeric composition, typically a polymeric coating, comprising a polymer of one or more acrylic acid esters, one or more methacrylic acid esters and/or other polymerizable vinyl compounds, having copolymerized therein one or more of the dye compounds described above. The colored polymeric compositions provided by our invention may be prepared from the coating compositions described above and typically contain from about 0.005 to 30.0 weight percent, preferably from about 05 to 15.0 weight percent, of the reactive or polymerized residue of one or more of the vinyl dye compounds described herein based on the weight of the composition or coating. The novel polymeric coatings may have a thickness of about 2.5 to 150 microns, more typically about 15 to 65 microns.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats.

Various additional pigments, plasticizers, and stabilizers may be incorporated to obtain certain desired characteristics in the finished products. These are included in the scope of the invention.

Coating, Curing, and Testing Procedures

Samples of formulations were used to coat glass plates using a knife blade. The wet film thickness was about 15 to 75 microns (0.6 to 3.0 mils). The solvent was evaporated to give a clear, somewhat tacky film. Prior to exposure to UV radiation, each film was readily soluble in organic solvents.

The dried film on the glass plate was exposed to UV radiation from a 200 watt per inch medium pressure mercury vapor lamp housed in an American Ultraviolet Company instrument using a belt speed of 25 ft. per minute. One to five passes under the lamp resulted in a crosslinked coating with maximum hardness and solvent resistance.

Each cured coating (film) may be evaluated for Konig Pendulum Hardness (ASTM D4366 DIN 1522), solvent resistance by the methyl ethyl ketone double-rub test, and solubility in acetone before and after exposure to UV radiation. The damping time for Konig Pendulum Hardness on uncoated glass is 250 seconds; coatings with hardness above 100 seconds are generally considered hard coatings. The methyl ethyl ketone (MEK) double rub test is carried out in accordance with ASTM Procedure D-3732 by saturating a piece of cheese cloth with methyl ethyl ketone, and with moderate pressure, rubbing the coating back and forth. The number of double rubs is counted until the coating is removed. The acetone solubility test is carried out by immersing a dry, pre-weighed sample of the cured film in acetone for 48 hours at 25° C. The film is removed, dried for 16 hours at 60° C. in a forced-air oven, and reweighed. The weight percent of the insoluble film remaining is calculated from the data.

COATING EXAMPLES

The coatings and coating compositions provided by the present invention and the preparation thereof are further illustrated by the following examples.

Example 19

A colored, photopolymerizable composition was prepared by thoroughly mixing 22.9 g of dipropylene glycol diacrylate, 69.1 g of Jaegalux UV-1500 (acrylated polyester oligomers), the red dye of Example 8 (4 g of a 1.25% solution of the dye in dipropylene glycol diacrylate), and 4 g of Darocure 1173 photoinitiator in a small Cowles mixer until the components were completely dispersed. This coating composition was drawn down with a wire wound rod to provide a 25.4 micron (1 mil) thick coating on an Oak wood panel. This panel was passed through a UV cure machine at a speed of 6.1 meters per minute (20 feet/minute) using a lamp with an intensity of 118.1 watts per cm (300 watts per inch). The same colored, photopolymerizable composition was applied to glass panels and cured under the same conditions of exposure. The hardness of the cured coating on the glass panels was 83 Konig seconds as compared to a hardness of 82 Konig seconds for a reference coating which contained no polymerizable dye. Adhesion of the coating to an oak wood panel was measured using the crosshatch adhesion method according to ASTM method D 3359 (ISO 2409). A right angle lattice pattern (6 lines in each direction) is cut into the coating, penetrating to the substrate, creating 25 squares with each side of the squares measuring 1 mm. A 2.5 cm (1 inch) wide piece of tape is applied to the lattice, pressure is applied, and then the tape is pulled from the substrate. If the edges are smooth and none of the squares are detached, the adhesion is 100% (ASTM rating 5B). On the wood panel a 5B rating was achieved for both the reference and the dye-containing coatings. On glass both coatings failed completely. Chemical resistance was tested with MEK double rubs on glass. Both the reference, which contained no polymerizable dye, and the coatings, which contained polymerizable dyes, withstood more than 300 MEK double rubs. No dye color could be observed on the white cheesecloth of the MEK rub test, which is an indication that the dyes cannot be extracted from the coatings with solvents and suggests complete incorporation of the dye into the polymer matrix of the cured film.

Example 20

A colored, photopolymerizable composition was prepared by thoroughly mixing 22.9 g of dipropylene glycol diacrylate, 69.1 g of Jaegalux UV-1500 (acrylated polyester oligomers), the blue dye having the structure:

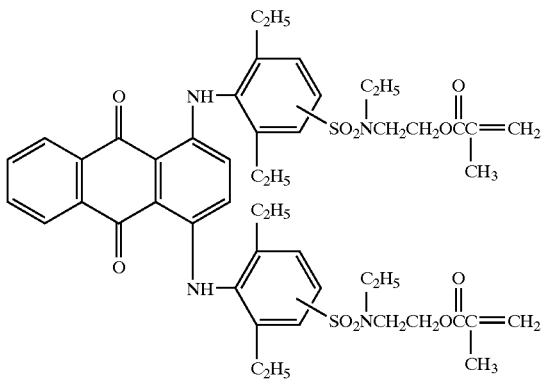

(4 g of a 1.25% solution of the dye in dipropylene glycol diacrylate), and 4 g of Darocure 1173 photoinitiator in a small Cowles mixer until the components were completely dispersed. This coating composition was drawn down with a wire wound rod to provide a 25.4 micron (1 mil) thick coating on an Oak wood panel.

This panel was passed through a UV cure machine at a speed of 6.1 meters per minute (20 feet/minute) using a lamp with an intensity of 118.1 watts per cm (300 watts per inch). Hardness measurements were conducted on glass using a Konig pendulum and did not indicate any significant loss of hardness due to incorporation of the dye; hardness was 83 Konig seconds. Adhesion of the coating to an oak wood panel was measured using the crosshatch adhesion method described in Example 19. On the wood panel a 5B rating was achieved for both the reference and the dye-containing coatings. All the coatings withstood more than 300 MEK double rubs. No loss of solvent resistance was observed with incorporation of the dye.

Example 21

A colored, photopolymerizable composition was prepared by thoroughly mixing 22.9 g of dipropylene glycol diacrylate, 69.1 g of Jaegalux UV-1500 (acrylated polyester oligomers), the red dye of Example 8 (2 g of a 1.25% solution of the dye in dipropylene glycol diacrylate), the blue dye set forth in Example 20 (2 g of a 1.25% solution of the dye in dipropylene glycol diacrylate), and 4 gram of Darocure 1173 photoinitiator in a small Cowles mixer until the components were completely dispersed. This coating composition, which is purple due to the mixing of the red and blue dyes, was drawn down with a wire wound rod to provide a 25.4 micron (1 mil) thick coating on an Oak wood panel. This panel was passed through a UV cure machine at a speed of 6.1 meters per minute (20 feet/minute) using a lamp with an intensity of 118.1 watts per cm (300 watts per inch). Hardness measurements were conducted on glass using a Konig pendulum and did not indicate any significant loss of hardness due to incorporation of the dye; hardness was 83 Konig seconds. Adhesion of the coating to an oak wood panel was measured using the crosshatch adhesion method described in Example 19. On the wood panel a 5B rating was achieved for both the reference coating and the dye-containing coatings. All of the coatings withstood more than 300 MEK double rubs. No significant loss of solvent resistance was observed with incorporation of the dye.

Example 22

A colored, photopolymerizable composition was prepared by thoroughly mixing 10.0 g dipropylene glycol diacrylate, 10.0 g tripropylene gylcol triacrylate, 20.0 g Jaegalux UV-1500 (acrylated polyester oligomers), 15 g Jaegalux UV-3800 (acrylated epoxy oligomers), the blue dye set forth in Example 20 (5.5 g of a 1.25% solution of the dye in dipropylene glycol diacrylate), and 2.2 gram of Irgacure 819 photoinitiator in a small Cowles mixer until the components were completely dispersed (20 minutes at 12,000 revolutions per minute). This coating composition was drawn down with a wire wound rod to provide a 38.1 micron (1.5 mil) thick coating on a cold rolled steel panel (iron phosphate pretreatment) and on polyethylene terephthalate sheet. The coated steel panel and polyester sheet were passed through a UV cure machine at a speed of 6.1 meters per minute (20 feet/minute) using a lamp with an intensity of 118.1 watts per cm (300 watts per inch). The Konig pendulum hardness of the coatings on the steel panels was 126 Konig seconds. No significant loss of hardness (relative to the reference coating) due to incorporation of the dye was observed. All the coatings withstood more than 500 MEK double rubs. No significant loss of solvent resistance was observed with incorporation of the dye. Adhesion tests of the coatings on polyethylene terephthalate sheeting using the crosshatch adhesion method described in Example 19 showed no loss of adhesion due to incorporation of the dye and 100% adhesion for the coatings.

Example 23

A colored, photopolymerizable composition was prepared by thoroughly mixing the blue dye set forth in Example 20 (10 g of a 2% solution of the dye in dipropylene glycol diacrylate), 20 gram trimethylol propane triacrylate, 20 g of polyester acrylate oligomer, 15 g of bisphenol A epoxy acrylate, and 4 gram of PI 1173 photoinitiator in a small Cowles mixer until the components were completely dispersed. The resulting coating composition was drawn down with a wire wound rod to provide a 25.4 micron (1 mil) thick coating on a 20 gauge sheet (1.27 mm–50 mils-thick) of polyethylene terephthalate (PET). The coated sheet was passed through a UV cure machine at a speed of 6.1 meters per minute (20 feet/minute) using a lamp with an intensity of 118.1 watts per cm (300 watts per inch). Hardness measured on glass by the Konig Pendulum method indicated no reduction of the hardness due to the dye; hardness was 105 Konig seconds. Adhesion tests of the coatings on polyethylene terephthalate sheet in accordance with the crosshatch adhesion method described in Example 19 showed no loss of adhesion due to incorporation of the dye and 100% adhesion for the coatings. All the coatings withstood more than 300 MEK double rubs. No significant loss of solvent resistance was observed with incorporation of the dye. The coating provided an attractive even color over the entire coated sheet.

Example 24

A colored, photopolymerizable composition was prepared by thoroughly mixing 0.5 g the yellow dye of Example 9 with a coating composition consisting of 20 g Jägalux UV1500 polyester acrylate, 10 g of bisphenol A epoxy acrylate, 9 g dipropyleneglycol diacrylate (DPGDA), 7 g trimethylolpropane triacrylate (TMPTA), and 4 g of Darocure 1173 photoinitiator using a small Cowles mixer until the components were completely dispersed. The resulting coating composition containing 1% of the yellow dye was drawn down with a wire wound rod to provide a 25.4 micron (1 mil) thick coating on an oak wood panel. This panel was passed through a UV cure machine at a speed of 6.1 meters per minute (20 feet/minute) using a lamp with an intensity of 118.1 watts per cm (300 watts per inch). The same coating solutions were applied to glass panels and cured under the same conditions of exposure. Konig Pendulum Hardness measurements (ASTM D4366 DIN 1522) were conducted on the coated glass panels and indicated no significant loss of hardness due to incorporation of the dye; hardness was 86 Konig seconds compared with 82 seconds for a reference coating, which contained no polymerizable dye. Adhesion of the coating to an oak wood panel was measured using the crosshatch adhesion method described in Example 19. On the wood panel a 5B rating was achieved for both the reference and the dye-containing coatings. Chemical resistance was tested with MEK double rubs on glass. Both the reference, which contained no polymerizable dye, and the coatings, which contained polymerizable dyes, withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

Example 25

A colored, photopolymerizable composition was prepared by thoroughly mixing 0.5 g the red dye of Example 10b with a coating composition consisting of 20 g Jägalux UV1500 polyester acrylate, 10 g of bisphenol A epoxy acrylate, 9 g dipropyleneglycol diacrylate (DPGDA), 7 g trimethylolpropane triacrylate (TMPTA), and 4 g of Darocure 1173 photoinitiator in a small Cowles mixer until the components were completely dispersed. The resulting coating composition, which contained 1% of the red dye, was drawn down with a wire wound rod to provide a 25.4 micron (1 mil) thick coating on an oak wood panel. This panel was passed through a UV cure machine at a speed of 6.1 meters per minute (20 feet/minute) using a lamp with an intensity of 118.1 watts per cm (300 watts per inch). The same coating solutions were applied to glass panels and cured under the same conditions of exposure. Konig Pendulum Hardness measurements conducted on the coated glass panels showed no significant loss of hardness due to incorporation of the dye; hardness was 76 Konig seconds compared with 82 seconds for a reference coating which contained no polymerizable dye.

The invention has been described in detail with particular reference to preferred embodiments thereof, but it will be understood that variations and modifications can be effected within the spirit and scope of the invention.

We claim:

1. Anthraquinone dye compounds having formula X. or formula XIV.:

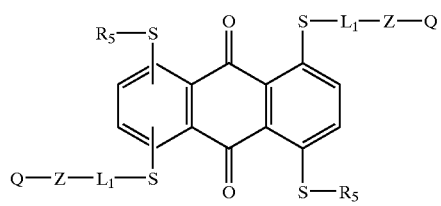

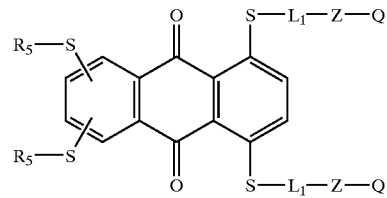

wherein:

R is hydrogen or 1–3 groups selected from $C_1$–$C_6$-alkyl, $C_1$–$C_6$-alkoxy and halogen;

$R_5$ is $C_1$–$C_6$-alkyl, substituted $C_1$–$C_6$ alkyl, $C_3$–$C_8$-cycloalkyl, aryl, heteroaryl, —$L_1$—Z—Q,

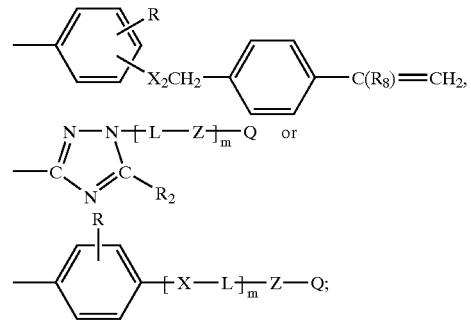

X is a covalent bond or a divalent linking group selected from —O—, —S—, —$SO_2$—, and —CON(Y)— wherein Y is hydrogen, $C_1$–$C_6$-alkyl, substituted $C_1$–$C_6$-alkyl, $C_3$–$C_8$-cycloalkyl, $C_3$–$C_8$-alkenyl, aryl or —L—Z—Q;

L is a divalent linking group selected from $C_1$–$C_8$-alkylene, $C_1$–$C_6$-alkylene-arylene, arylene, $C_1$–$C_6$-alkylene-arylene-$C_1$–$C_6$-alkylene, $C_3$–$C_8$-cycloalkylene, $C_1$–$C_6$-alkylene-$C_3$–$C_8$-cycloalkylene-$C_1$–$C_6$-alkylene, $C_1$–$C_6$-alkylene-$Z_1$-arylene-$Z_1$—$C_1$–$C_6$-alkylene or $C_2$–$C_6$-alkylene-[—$Z_1$—$C_2$–$C_6$-alkylene-]$_n$— wherein $Z_1$ is —O—, —S— or —$SO_2$— and n is 1–3;

$L_1$ is a divalent linking group selected from $C_2$–$C_6$-alkylene, $C_1$–$C_6$-alkylene-$C_3$–$C_8$-cycloalkylene-$C_1$–$C_6$-alkylene, $C_1$–$C_6$-alkylene-arylene, $C_3$–$C_8$-cycloalkylene, and $C_2$–$C_6$-alkylene-[—$Z_1$—$C_2$–$C_6$-alkylene-]$_n$-, wherein $Z_1$ is —O—, —S— or —$SO_2$— and n is 1–3;

Z is a divalent group selected from —O—, —S—, —NH—, —N($C_1$–$C_6$-alkyl)-, —N($C_3$–$C_8$ alkenyl)-, —N($C_3$–$C_8$ cycloalkyl)-, —N(aryl)-, —N($SO_2C_1$–$C_6$-alkyl) or —N($SO_2$ aryl)-, provided that when Q is a photopolymerizable optionally substituted maleimide radical, Z represents a covalent bond;

Q is an ethylenically-unsaturated, photosensitive polymerizable group; and is 0 or 1.

2. Anthraquinone compounds according to claim 1 wherein the ethylenically-unsaturated, photosensitive copolymerizable groups represented by Q are selected from the following organic radicals:

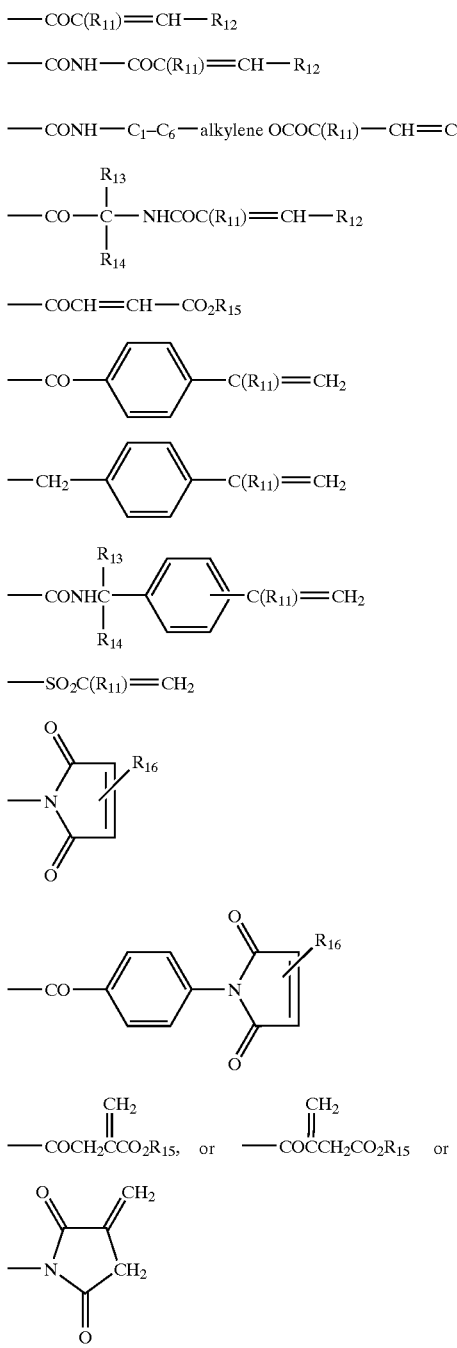

$R_{15}$ is hydrogen, $C_1$–$C_6$-alkyl, substituted $C_1$–$C_6$-alkyl, $C_3$–$C_8$-alkenyl, $C_3$–$C_8$-cycloalkyl or aryl and;

$R_{16}$ is hydrogen, $C_1$–$C_6$-alkyl- or aryl.

3. Anthraquinone compounds according to claim 2 having the formula:

X.

wherein Z is —O—.

4. Anthraquinone compounds according to claim 2 having the formula:

XIV.

wherein Z is —O—.

5. Anthraquinone compounds according to claim 2 wherein Q is organic radical Ia.

6. Anthraquinone compounds according to claim 2 wherein Q is organic radical Ia wherein $R_{11}$ is hydrogen or methyl and $R_{12}$ is hydrogen.

7. Anthraquinone compounds according to claim 2 wherein Q is organic radical VIIa.

8. Anthraquinone compounds according to claim 2 wherein Q is organic radical VIIa wherein $R_{11}$ is hydrogen.

9. Anthraquinone compounds according to claim 2 wherein Q is organic radical VIIIa.

10. Anthraquinone compounds according to claim 2 wherein Q is organic radical VIIIa wherein $R_{11}$ is hydrogen or methyl and $R_{13}$ and $R_{14}$ are methyl.

11. A coating composition comprising (i) one or more polymerizable vinyl compounds, (ii) one or more of the dye compounds of claim 1, and (iii) a photoinitiator.

12. A coating composition comprising (i) one or more polymerizable vinyl compounds, (ii) one or more of the dye compounds of claim 2 present in a concentration of about 0.05 to 15 weight percent based on the weight of component (i), and (iii) a photoinitiator present in a concentration of about 1 to 15 weight percent based on the weight of the polymerizable vinyl compound(s) present in the coating composition.

13. A coating composition according to claim 12 wherein the polymerizable vinyl compounds comprise a solution of a polymeric, polymerizable vinyl compound selected from acrylated and methacrylated polyesters, acrylated and methacrylated polyethers, acrylated and methacrylated epoxy polymers, acrylated or methacrylated urethanes, and mixtures thereof, in a diluent selected from monomeric acrylate and methacrylate esters.

14. A polymeric coating composition comprising a polymer of one or more acrylic acid esters, one or more methacrylic acid esters or other copolymerizable vinyl compounds, having copolymerized therein one or more of the dye compounds defined in claim 1.

15. A polymeric coating composition comprising a coating of an acrylic polymer of one or more acrylic acid esters, one or more methacrylic acid esters or a mixture thereof having copolymerized therein one or more of the dye compounds defined in claim 2.

16. A polymeric coating composition comprising a coating of an unsaturated polyester containing one or more maleate/fumarate residues; one or more monomers which contain one or more vinyl ether groups, one or more vinyl ester groups, or a combination thereof, and, optionally, one or more acrylic or methacrylic acid esters; or a mixture thereof having copolymerized therein one or more of the dye compounds defined in claim 2.

17. A polymeric coating according to claim 16 containing from about 0.05 to 15.0 weight percent of the residue of one or more of the dye compounds based on the weight of the coating.

* * * * *

UNITED STATES PATENT AND TRADEMARK OFFICE
CERTIFICATE OF CORRECTION

PATENT NO. : 6,870,062 B2
DATED : March 22, 2005
INVENTOR(S) : Cyr et al.

It is certified that error appears in the above-identified patent and that said Letters Patent is hereby corrected as shown below:

Column 36,
Lines 18-25, the first and second structures, should be deleted.

Column 40,
Line 4, "Claim 16" should be -- Claim 15 --.

Signed and Sealed this

Fifth Day of July, 2005

JON W. DUDAS
*Director of the United States Patent and Trademark Office*